United States Patent [19]

Shioya

[11] Patent Number: 5,748,869
[45] Date of Patent: May 5, 1998

[54] COORDINATE TRANSFORMATION APPARATUS AND METHOD

[75] Inventor: Hiroyuki Shioya, Tokyo, Japan

[73] Assignee: Sony Corporation, Tokyo, Japan

[21] Appl. No.: 347,281

[22] Filed: Nov. 30, 1994

[30] Foreign Application Priority Data

Dec. 3, 1993 [JP] Japan ............................ 5-304364

[51] Int. Cl.$^6$ ............................................ G06F 15/00
[52] U.S. Cl. ................................................. 395/142
[58] Field of Search ................................ 395/142, 141, 395/143, 140; 345/16, 17, 18

[56] References Cited

U.S. PATENT DOCUMENTS 5,265,197  11/1993  Kondo ........................................ 395/141

Primary Examiner—Phu K. Nguyen
Attorney, Agent, or Firm—Limbach & Limbach L.L.P.

[57] ABSTRACT

A texture mapping coordinate transformation apparatus for producing post-transformation coordinates by a ratio of plural polynomials having pre-transformation coordinates as variables in order to map a texture picture on a polygon defined by perspective coordinates on a display screen to thereby generate an output display picture on the display screen, and which includes a post-transformation coordinate memory for storing the post-transformation coordinates an error evaluation value memory for storing error evaluation values of the post-transformation coordinates, an error judgment detector for determining that the error evaluation value is within a tolerable range, an initial value setting circuit for setting respective initial values of the post-evaluation coordinate memory and the error evaluation value memory based upon the pre-transformation coordinates, an updating circuit for updating the contents of the post-transformation coordinate memory and the error evaluation value memory responsive to an output of the error judgment circuit, and a circuit for sequentially finding the post-transformation coordinates from the pre-transformation coordinates.

16 Claims, 9 Drawing Sheets

COORDINATE TRANSFORMATION APPARATUS AND METHOD

BACKGROUND OF THE INVENTION

This invention relates to a method and apparatus employed for transforming coordinates in, for example, texture mapping in computer graphics.

In video equipment employing a computer, such as a graphics computer, special effect device or a video game, it occurs frequently that pictures are generated using a technique known as texture mapping. This texture mapping refers to a technique in which a texture picture such as an image or a pattern is mapped on a so-called polygon on screen coordinates for generating a high-quality output picture. Such a polygon is a polygonal-shaped section of a plane used as a basic unit in representing a figure in the art of computer graphics (CG). The screen coordinates, also known as perspective coordinates, mean coordinates projected within a two-dimensional plane of a three-dimensional field of view about a point as the center of projection.

FIG. 1 shows a flow chart showing the flow of a conventional texture mapping technique. FIGS. 2(A) and 2(B) show the relation between the polygon prior to mapping of the texture on the screen coordinates and the texture on the texture coordinates, respectively.

At a first step S101 of FIG. 1, coordinate transformation coefficients of a transformation between the polygon on the screen coordinates and the picture on the texture coordinates is calculated. In FIG. 2, if four points $(x_0, y_0)$, $(x_1, y_1)$, $(x_2, Y_2)$, $(x_3, Y3)$ on the screen coordinates at A are associated with four points $(u_0, v_0)$, $(u_1, v_1)$, $(u_2, v_2)$, $(u_3, v_3)$ on the texture coordinates at B of FIG. 2(B), the following equations 48, 49 hold.

$$\begin{bmatrix} u_0 & v_0 & 1 & 0 & 0 & 0 & -1u_0x_0 & -v_0x_0 \\ u_1 & v_1 & 1 & 0 & 0 & 0 & -1u_1x_1 & -v_1x_1 \\ u_2 & v_2 & 1 & 0 & 0 & 0 & -1u_2x_2 & -v_2x_2 \\ u_3 & v_3 & 1 & 0 & 0 & 0 & -1u_3x_3 & -v_3x_3 \\ 0 & 0 & 0 & u_0 & v_0 & 1 & -u_0y_0 & -v_0y_0 \\ 0 & 0 & 0 & u_1 & v_1 & 1 & -u_1y_1 & -v_1y_1 \\ 0 & 0 & 0 & u_2 & v_2 & 1 & -u_2y_2 & -v_2y_2 \\ 0 & 0 & 0 & u_3 & v_3 & 1 & -u_3y_3 & -v_3y_3 \end{bmatrix} A = \begin{bmatrix} x_0 \\ x_1 \\ x_2 \\ x_3 \\ y_0 \\ y_1 \\ y_2 \\ y_3 \end{bmatrix} \quad (48)$$

$$A = [a_{11}\ a_{21}\ a_{31}\ a_{12}\ a_{22}\ a_{32}\ a_{13}\ a_{23}]^T \quad (49)$$

In these equations, A represents the coordinate transformation coordinate. The equations (48) and (49) are stated in the publication of "DIGITAL IMAGE MAPPING", by George Wolberg, IEEE Computer Society Press, Sections 3.4 to 3.4.2. Thus the coordinate transformation equations for transforming the screen coordinates into the texture coordinates are:

$$u = \frac{a_{11}x + a_{21}y + a_{31}}{a_{13}x + a_{23}y + 1}, v = \frac{a_{12}x + a_{22}y + a_{32}}{a_{13}x + a_{23}y + 1} \quad (50)$$

FIGS. 3(A) and 3(B) show the manner in which a point p on the screen coordinates is mapped by coordinate transformation to a point q on the texture coordinates.

Then, at a step S102 as shown in FIG. 1, the polygon on the screen coordinates is drawn on an actual screen. Usually, such actual screen is a screen surface of a raster scan type display apparatus. Consequently, the polygon is divided based upon scanning lines on the screen coordinates as units, and the starting and end points of the scanning lines are determined. FIG. 4 shows, as an example, a starting point $P_S$ and an end point $P_E$ an n'th scanning line.

At steps S103 to S107, the portion of the scanning line from the starting point up to the end point are coordinate-transformed pixel-by-pixel for writing pixel values at associated points on the texture coordinates and for interpolation, as shown in FIG. 5. At the next step S108, the processing from the step S102 to the step S107 is repeated for the entire scanning lines within the polygon. FIG. 6(A) shows the state of the screen coordinates on completion of texture mapping. FIG. 6(B) shows texture coordinates.

The coordinate transformation equation in the above steps S103 to S107 is in the form of a polynomial/polynomial, as shown at (50). The method of calculation is roughly divided into two types of calculations.

One of such types is to execute division in order to find the ratio of the polynomial/polynomial. The other is to substitute an approximate polynomial such as $u = a_3 x^3 + a_2 x^2 + a_1 x + a_0$ for the coordinate transformation formula in order to avoid the division. FIG. 1 shows the former by way of an example.

That is, at a step S103 of FIG. 4, the start point PS is set as an initial value of a pixel point to be interpolated. Processing then transfers to the next step S104 where the values of the polynomials representing the divisor and the dividend of the coordinate transformation equation are calculated. At the next step S105, the dividend is divided by the divisor and the solution is set as the coordinate transformation value. At the next step S106, the coordinate value on the texture coordinates are written at the pixel points within the polygon. At the next step S107, the above interpolation is repeatedly executed up to the end point.

FIG. 7 shows an example of the method of substituting the approximate polynomial. Such method is disclosed for example in Wolberg, in Sections 7.2.6 to 7.2.7.

In FIG. 7, the steps corresponding to the steps in FIG. 1 are denoted by the same reference numerals and the corresponding description is omitted. In the example of FIG. 7, steps S113 to S116 are executed in place of the steps S103 to S107.

At the step S113, the starting point PS is set as the initial value of the interpolating pixel point. From the coordinate transformation coordinates, starting point $P_S$ and the end point $P_E$, coefficients of respective terms of the approximate polynomial are pre-calculated and stored. At the next step S115, pixel values in the texture coordinates are written at the pixel points in the polygon. At the next step S116, such interpolation is repeatedly executed up to the end point.

If the division is performed in accordance with the calculation equation, correct results of the calculation are obtained. However, the division is more complex and more time-consuming than addition or substraction. Further, if the division process be built into the integrated circuit as hardware, the area occupied by the high-speed hardware division unit in the entire circuit is larger than that occupied by the adder or subtractor.

On the other hand, the method of finding an approximate solution using the approximate polynomial in place of carrying out the division, as shown in FIG. 7, leads to a fast operation because the processing operation involves only the addition and subtraction. Also, the hardware may be reduced in size because the circuit may be constructed only by adders and subtractors. However, since the approximate calculation is performed, the results are susceptible to error or distortion.

OBJECTS AND SUMMARY OF THE INVENTION

In view of the foregoing, it is an object of the present invention to provide a method and apparatus for coordinate transformation whereby correct results of calculation may be obtained by a small-scale hardware.

According to the present invention, there is provided a coordinate transformation apparatus for producing post-transformation coordinates by a ratio of plural polynomials having pre-transformation coordinates as variables. The apparatus comprises post-transformation coordinate storage means for storing the post-transformation coordinates, error evaluation value storage means for storing the error evaluation values of the post-transformation coordinates, error judgment means for judging that the error evaluation value is within a tolerable range, initial value setting means for setting respective initial values of the post-evaluation coordinate storage means and the error evaluation value storage means based upon the pre-transformation coordinates and updating means for updating the contents of the post-transformation coordinate storage means and the error evaluation value storage means responsive to an output of the error judgment means. The post-transformation coordinates are sequentially found from the pretransformation coordinates.

The updating means preferably has plural selective operation sections for selectively operating on plural inputs, so as to update in parallel values of the post-transformation coordinate storage means and the error judgement means to perform high-speed operation.

According to the present invention, there is also provided a coordinate transformation method for producing post-transformation coordinates by a ratio of plural polynomials having pre-transformation coordinates as variables, wherein a component of the post-transformation coordinate is found by a ratio $N_k/D_k$, $N_k$ and $D_k$ being polynomials which are the functions of coordinate components of an arbitrary k'th coordinate point before transformation, and wherein if the quotient obtained by calculating $N_k/D_k$ by integer division is a coordinate component $Q_k$ of the k'th coordinate point after transformation, the remainder is $R_k$, that is $$N_k = D_k \times Q_k + R_k \qquad (1)$$

and if a quotient of a division of the above coordinate transformation on the next (k+1)th coordinate point before transformation is $Q_{k+1}$, with the remainder being $R_{k+1}$, that is $$N_{k+1} = D_{k+1} \times Q_{k+1} + R_{k+1} \qquad (2)$$

the above equation (1) is rewritten to $$N_k + \Delta N = (D_k + \Delta D) \times Q_k + R_k + \Delta N - \Delta D \times Q_k \quad N_{k+1} = D_{k+1} \times Q_k + R_k + \Delta N - \Delta D \times Q_k \qquad (3)$$

with $\Delta N$ being a dividend difference $N_{k+1} - N_k$ and $\Delta D$ being a divisor difference $D_{k+1} - D_k$ and, since comparison of the equations (2) and (3) gives $$Q_{k+1} = Q_k + (R_k + \Delta N - \Delta D \times Q_k)/D_{k+1} \qquad (4)$$

$$R_{k+1} = (R_k + \Delta N - \Delta D \times Q_k) \bmod D_{k+1} \qquad (5)$$

the component $Q_{k+1}$ of the post-transformation coordinate next to the known coordinate component $Q_k$ of the post-transformation coordinate point is found from the equation (4) in place of calculating $N_{k+1}/D_{k+1}$, the equation (4) being calculated with the division in the equation (4) being replaced by addition and subtraction.

In the coordinate transformation method, the component $Q_{k+1}$ of the post-transformation coordinate is found from the equations (4) and (5) using a known component of the post-transformation coordinate $Q_k$, comprising a first calculating step of setting a constant $\Delta Q$, an allowable calculation error range of the post-transformation coordinate, and finding the dividend difference value $\Delta N$ and the divisor difference value $\Delta D$ by calculations, a second calculating step of finding $D_{k+1}$, $R_{k+1}$, $Q_{k+1}$ by calculating equations $$D_{k+1} = D_k + \Delta D \qquad (6)$$

$$R_{k+1} = R_k + \Delta N - \Delta D \times Q_k \qquad (7)$$

$$Q_{k+1} \; Q_k \qquad (8)$$

a first correction step of executing correction by $$R_{k+1} \leftarrow R_{k+1} + D_{k+1} \times \Delta Q \qquad (9)$$

$$Q_{k+1} \leftarrow Q_{k+1} + \Delta Q \qquad (10)$$

where $\leftarrow$ denotes substitution, if the condition of the found value of $R_{k+1}$ being smaller than 0 ($R_{k+1} < 0$) is met, a second correction step of executing correction by $$R_{k+1} \leftarrow R_{k+1} - D_{k+1} \times \Delta Q \qquad (11)$$

$$Q_{k+1} \leftarrow Q_{k+1} + \Delta Q \qquad (12)$$

if the condition of the found value of $R_{k+1}$ being not less than the value of $D_{k+1}$ is met ($D_{k+1} \leq R_{k+1}$) is met, an error evaluating step of judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

The coordinate transformation method, wherein the component $Q_{k+1}$ of the post-transformation coordinate is found from the equations (4) and (5) using a known component of the post-transformation coordinate $Q_k$, comprises a first calculating step of setting a constant $\Delta Q$, an allowable calculation error range of the post-transformation coordinate, and finding the dividend difference value $\Delta N$ and the divisor difference value $\Delta D$ by calculations, and finding a composite difference value $C_k$ by $$C_k = \Delta D \times Q_k \qquad (13)$$

a second calculating step of finding $D_{k+1}$, $R_{k+1}$, $Q_{k+1}$ and $C_{k+1}$ by $$D_{k+1} = D_k + \Delta D \qquad (14)$$

$$R_{k+1}=R_k+\Delta N \to C_k \quad (15)$$

$$Q_{k+1}=Q_k \quad (16)$$

$$C_{k+1}=C_k \quad (17)$$

a first correcting step of executing the correction by $$R_{k+1} \leftarrow R_{k+1}+|D_{k+1}| \times \Delta Q \quad (18)$$

$$Q_{k+1} \leftarrow Q_{k+1}+\Delta Q \quad (19)$$

$$C_{k+1} \leftarrow C_k+\Delta D \times \Delta Q \quad (20)$$

where ← denotes substitution, if the condition of the found value of $R_{k+1}$ being smaller than 0 is met ($R_{k+1}<0$), a second correcting step of executing the correction by $$R_{k+1} \leftarrow R_{k+1}+|D_{k+1}| \times \Delta Q \quad (21)$$

$$Q_{k+1} \leftarrow Q_{k+1}+\Delta Q \quad (22)$$

$$C_{k+1} \leftarrow c_k+\Delta D \times \Delta Q \quad (23)$$

if the condition of the found value of $R_{k+1}$ being not less than the above value of $D_{k+1}$ is met ($D_{k+1} \leq R_{k+1}$), and an error evaluating step of judging whether or not the condition of the found value of $R_{k+1}$ being not less than 0 and less than the value of $D_{k+1}$ is met ($0<R_{k+1}<D_{k+1}$) and repeating the first or second correction step if such condition is not met, with the value of $Q_{k+1}$ when the above condition is met being the ultimate result of coordinate transformation.

The coordinate transformation method, wherein the component $Q_{k+1}$ of the post-transformation coordinate is found from the equations (4) and (5) using a known component of the posttransformation coordinate $Q_k$, comprises a first calculating step of setting a constant $\Delta Q$, an allowable calculation error range of the post-transformation coordinate, and finding the dividend difference value $\Delta N$ and the divisor difference value $\Delta D$ by calculations, and finding a composite difference value $C_k$ by $$C_k = \Delta D \times Q_k \Delta N \quad (24)$$

a second calculating step of finding $D_{k+1}$, $R_{k+1}$, $Q_{k+1}$ and $C_{k+1}$ by $$D_{k+1}=D_k+\Delta D \quad (25)$$

$$R_{k+1}=R_k-C_k \quad (26)$$

$$Q_{k+1}=Q_k \quad (27)$$

$$C_{k+1}=C_k \quad (28)$$

a first correcting step of executing the correction by $$R_{k+1} \leftarrow R_{k+1}+|D_{k+1}| \times \Delta Q \quad (29)$$

$$Q_{k+1} \leftarrow Q_{k+1}+\Delta Q \quad (30)$$

$$C_{k+1} \leftarrow C_k+\Delta D \times \Delta Q \quad (31)$$

where ← denotes substitution, if the condition of the found value of $R_{k+1}$ being smaller than 0 is met ($R_{k+1}<0$), a second correcting step of executing the correction by $$R_{k+1} \leftarrow R_{k+1}-|D_{k+1}| \times \Delta Q \quad (32)$$

$$Q_{k+1} \leftarrow Q_{k+1}+\Delta Q \quad (33)$$

$$C_{k+1} \leftarrow C_k+\Delta D \times \Delta Q \quad (34)$$

if the condition of the found value of $R_{k+1}$ being not less than the above value of $D_{k+1}$ is met ($D_{k+1} \leq R_{k+1}$), and an error evaluating step of judging whether or not the condition of the found value of $R_{k+1}$ being not less than 0 and less than the value of $D_{k+1}$ is met ($0 \leq R_{k+1}<D_{k+1}$) and repeating the first or second correction step if such condition is not met, with the value of $Q_{k+1}$ when the above condition is met being the ultimate result of coordinate transformation.

The coordinate transformation method, wherein the component $Q_{k+1}$ of the post-transformation coordinate is found from the equations (4) and (5) using a known component of the post-transformation coordinate $Q_k$, comprises a first calculating step of setting a constant $\Delta Q$, an allowable calculation error range of the post-transformation coordinate, and finding the dividend difference value $\Delta N$ and the divisor difference value $\Delta D$ by calculations, and finding a composite difference value $C_k$, a divisor value $D_k$ and a divisor difference value $\Delta D$ by $$C_k=\Delta D \times Q_k - \Delta N \quad (35)$$

$$D_k \leftarrow D_k \times \Delta Q \quad (36)$$

$$\Delta D \leftarrow \Delta D \times \Delta Q \quad (37)$$

where ← denotes substitution, a second calculating step of finding $D_{k+1}$, $R_{k+1}$, $Q_{k+1}$ and $C_{k+1}$ by $$D_{k+1}=D_k+\Delta D \quad (38)$$

$$R_{k+1}=R_k-C_k \quad (39)$$

$$Q_{k+1}=Q_k \quad (40)$$

$$C_{k+1}C_k \quad (41)$$

a first correcting step of executing the correction by $$R_{k+1} \leftarrow R_{k+1}+|D_{k+1}| \quad (42)$$

$$Q_{k+1} \leftarrow Q_{k+1}+\Delta Q \quad (43)$$

$$C_{k+1} \leftarrow C_k+\Delta D \quad (44)$$

if the condition of the found value of $R_{k+1}$ is not larger than 0 ($R_{k+1}<0$) is met, a second correcting step of executing the correction by $$R_{k+1} \leftarrow R_{k+1}-|D_{k+1}| \quad (45)$$

$$Q_{k+1} \leftarrow Q_{k+1}+\Delta Q \quad (46)$$

$$C_{k+1}C_k+\Delta D \quad (47)$$

if the condition of the found value of $R_{k+1}$ being not less than the above value of $D_{k+1}$ is met ($D_{k+1} \leq R_{k+1}$), and an error evaluating step of judging whether or not the condition of the found value of $R_{k+1}$ being not less than 0 and less than the value of $D_{k+1}$ is met ($0<R_{k+1}<D_{k+1}$) and repeating the first or second correction step if such condition is not met, with the value of $Q_{k+1}$ when the above condition is met being the ultimate result of coordinate transformation.

In the coordinate transformation method, after executing the first calculating step once, the second calculating step, the first or second correction step and the error evaluation step are preferably repeated for executing coordinate transformation for a series of coordinates. Also, the constant $\Delta Q$, an allowable calculation error range for the post-transformation coordinates, is preferably set to 1.

In obtaining the post-transformation coordinate by dividing plural polynomials having pre-transformation coordinates as variables, only addition and subtraction suffice without using division to produce precise results similar to those with division. Thus, the hardware scale can be diminished.

DESCRIPTION OF PREFERRED EMBODIMENT

Figure 1:
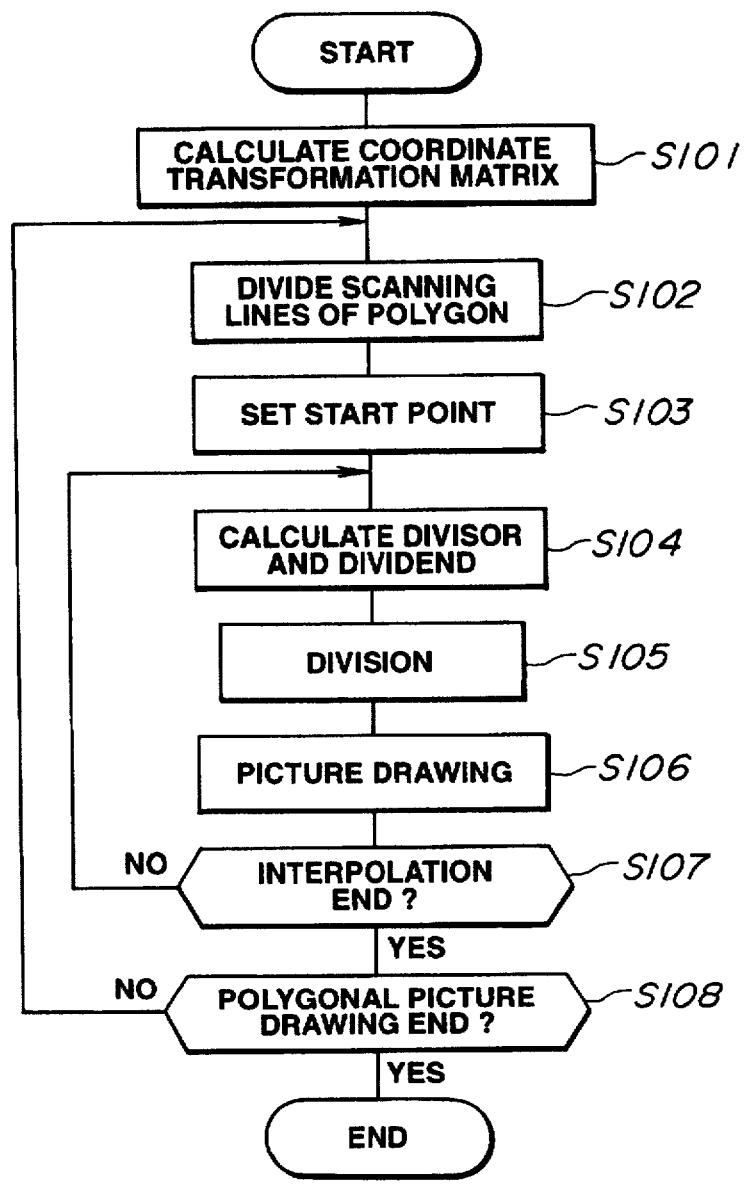
FIG. 1 is a flow chart for illustrating the operation of a typical conventional coordinate transformation operation.
Figures 2A, 2B:
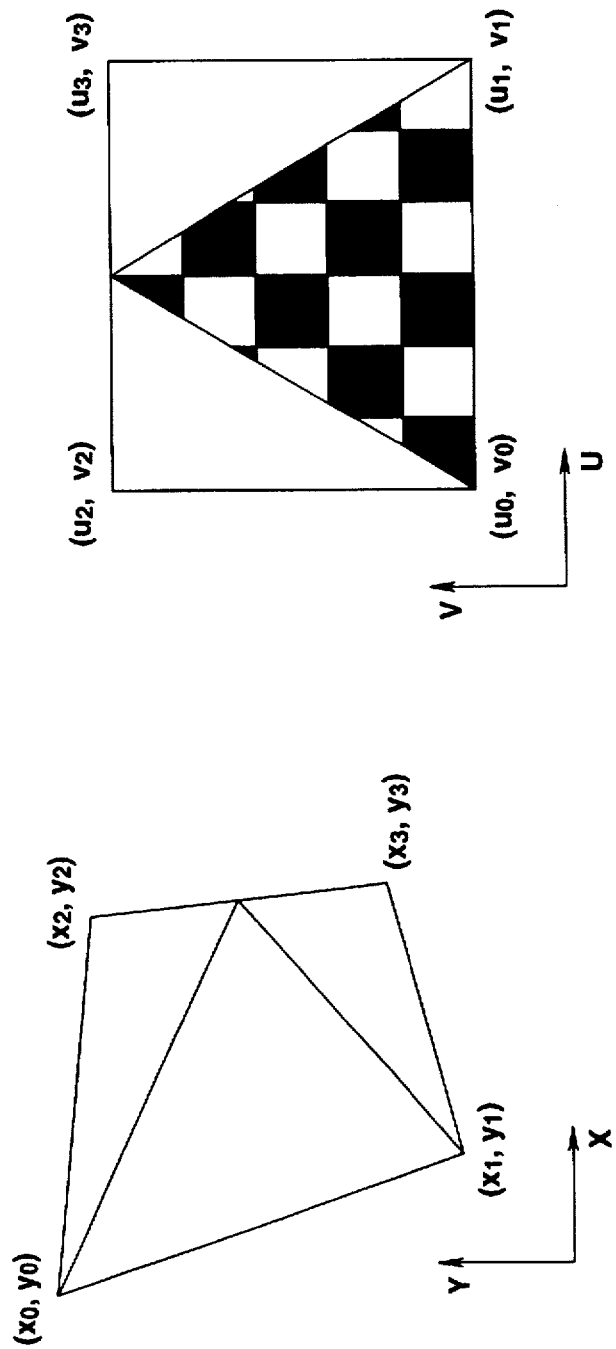
FIGS. 2(A) and (B) illustrates a polygon before mapping a texture on a screen coordinate system and a texture on the texture coordinate system.

Referring to the drawings, a preferred embodiment of the present invention is explained in detail.

Figure 8:
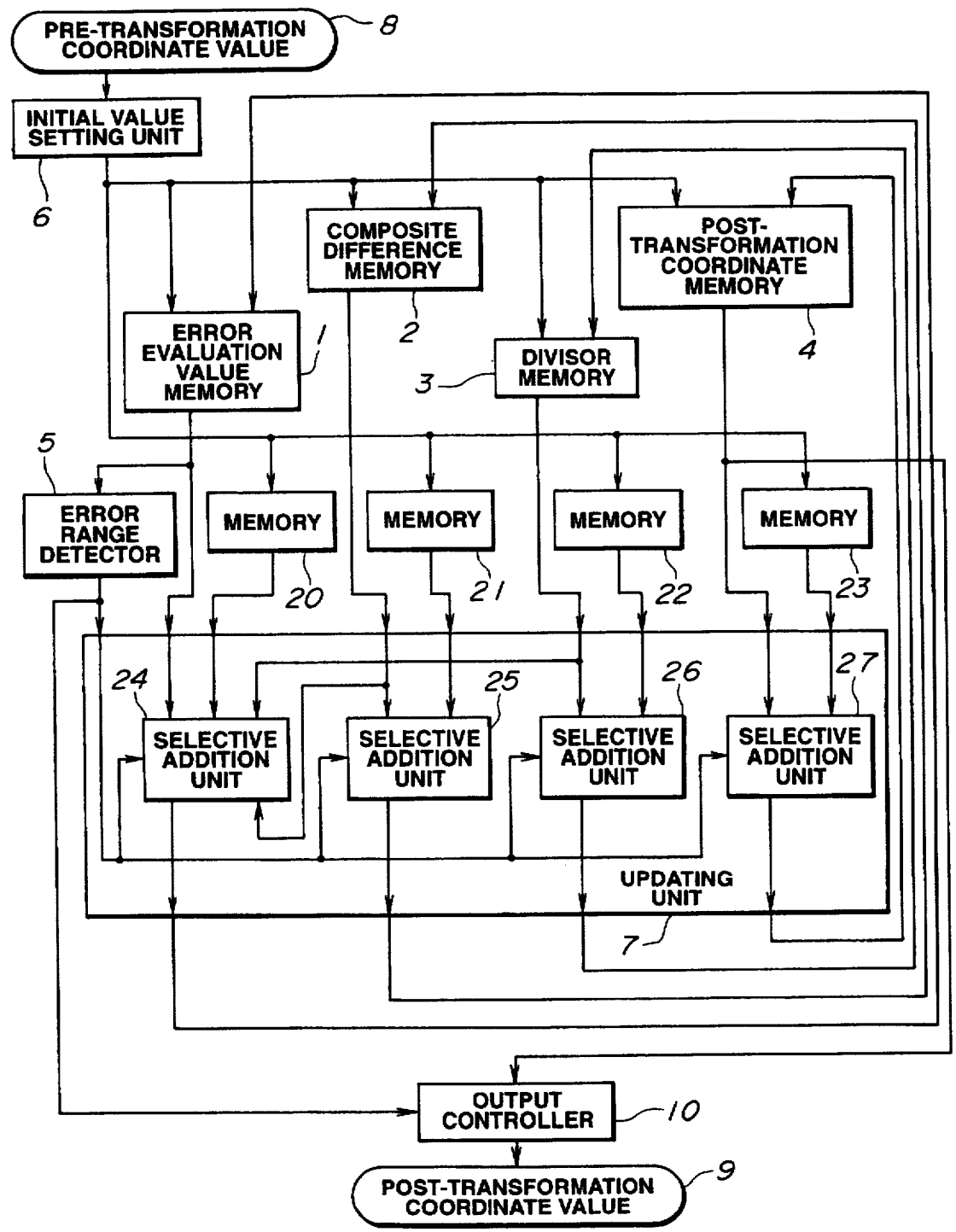
FIG. 8 is a schematic block circuit diagram showing an embodiment of a coordinate transformation apparatus according to the present invention.
Figure 9:
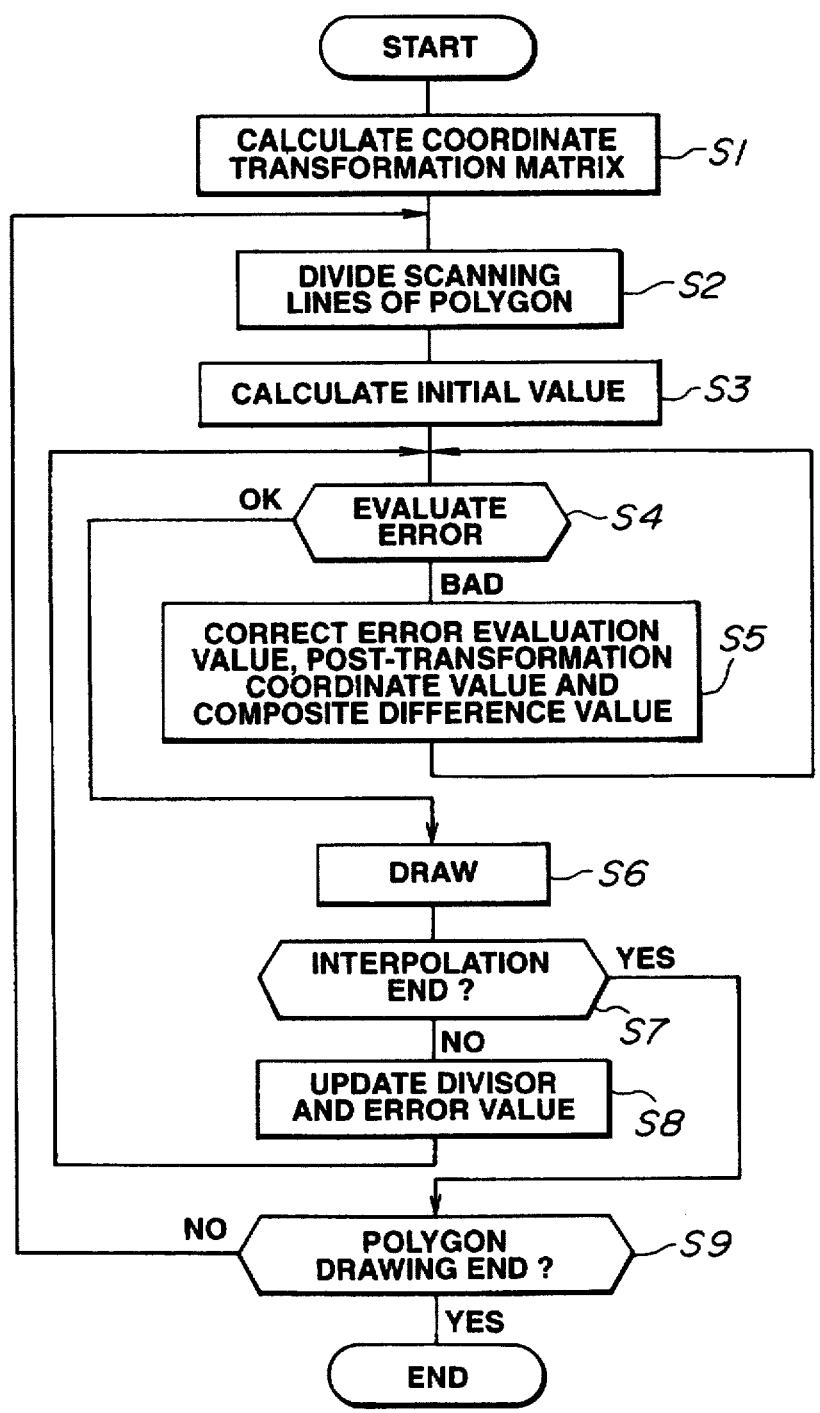
FIG. 9 is a flow chart for illustrating the schematic operation of an embodiment of a coordinate transformation method according to the present invention.

FIG. 8 is a schematic block diagram showing a coordinate transformation apparatus according to the present invention, and FIG. 9 shows a flow chart for illustrating its operation.

FIG. 8 shows an example of a coordinate transformation apparatus for executing coordinate transformation equivalent to the coordinate transformation of obtaining the post-transformation coordinates by the ratio of plural polynomials having pre-transformation coordinates as variables. The present coordinate transformation apparatus includes a post-transformation coordinate value memory 4 for storing the posttransformation coordinates, an error evaluation value storage memory 1 for storing the error evaluation values of the post-transformation coordinates, an error range detection unit 5 for detecting that the error evaluation value is within an allowable range, an initial value setting unit 6 for setting respective initial values of the post-evaluation coordinate memory 4 and the error evaluation value memory 1 based upon the pre-transformation coordinates and an updating unit 7 for updating the contents of the post-transformation coordinate memory 4 and the error evaluation memory 1 responsive to an output of the error range detection unit 5. The post-transformation coordinates are sequentially found from the pre-transformation coordinates.

The updating unit 7 has plural selective addition units 24, 25, 26 and 27 for selecting plural inputs for performing arithmetic-logical operations thereon. The selective addition units 27, 24, for example, update the values of the post-transformation coordinate value memory 4 and the evaluation value memory 1 in parallel for speedup of the operation. As for other respects, the construction shown in FIG. 8 is explained in connection with the description of the operation using the flow chart of FIG. 9.

FIG. 9 shows the flow chart for illustrating the operation of the coordinate transformation apparatus shown in FIG. 8. At a first step S1 of FIG. 9, a coordinate transformation coefficient between the polygon on the screen coordinates and the picture on the texture coordinates is found.

If it is assumed that the four points $(x_0, y_0)$, $(x_1, y_1)$, $(x_2, Y_2)$, $(x_3, y_3)$ on the screen coordinates are associated with four points $(u_0, v_0)$, $(u_1, vl)$, $(u_2, v_2)$, $(u_3, v_3)$ on the texture coordinates, the above equations 48, 49 hold. That is, $$\begin{bmatrix} u_0 & v_0 & 1 & 0 & 0 & 0 & -1u_0x_0 & -v_0x_0 \\ u_1 & v_1 & 1 & 0 & 0 & 0 & -1u_1x_1 & -v_1x_1 \\ u_2 & v_2 & 1 & 0 & 0 & 0 & -1u_2x_2 & -v_2x_2 \\ u_3 & v_3 & 1 & 0 & 0 & 0 & -1u_3x_3 & -v_3x_3 \\ 0 & 0 & 0 & u_0 & v_0 & 1 & -u_0y_0 & -v_0y_0 \\ 0 & 0 & 0 & u_1 & v_1 & 1 & -u_1y_1 & -v_1y_1 \\ 0 & 0 & 0 & u_2 & v_2 & 1 & -u_2y_2 & -v_2y_2 \\ 0 & 0 & 0 & u_3 & v_3 & 1 & -u_3y_3 & -v_3y_3 \end{bmatrix} A = \begin{bmatrix} x_0 \\ x_1 \\ x_2 \\ x_3 \\ y_0 \\ y_1 \\ y_2 \\ y_3 \end{bmatrix} \quad (48)$$

$$A = [a_{11}\ a_{21}\ a_{31}\ a_{12}\ a_{22}\ a_{32}\ a_{13}\ a_{23}]^T \quad (49)$$

In these equations, A represents the coordinate transformation coefficient. Thus the equation 50

$$u = \frac{a_{11}x + a_{21}y + a_{31}}{a_{13}x + a_{23}y + 1}, v = \frac{a_{12}x + a_{22}y + a_{32}}{a_{13}x + a_{23}y + 1} \quad (50)$$

represents a coordinate transformation equation for transforming the screen coordinates into the texture coordinates.

Then, at a step S2 of FIG. 9, the polygon on the screen coordinates is drawn on an actual screen. Since the actual screen is usually a screen surface of a raster scan type display device, the picture is divided according to scanning lines for raster scanning and drawn in this state. Thus the polygon is divided according to the scanning lines on the screen coordinates and the start and end points are determined. In place of dividing the picture based upon the horizontal scanning lines, it is also possible to divide the picture according to straight lines parallel to a vertical axis (Y-axis) or a straight line having an arbitrary inclination with respect to the vertical axis, and to process the picture according to these straight lines.

Figure 5:
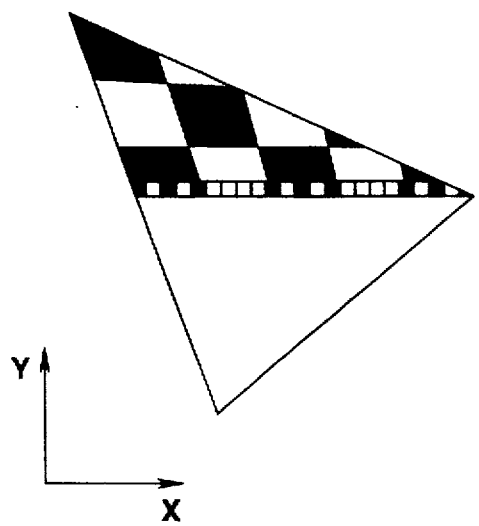
FIG. 5 illustrates interpolation for respective pixels on a scanning line on a screen coordinate system.
Figure 6B:
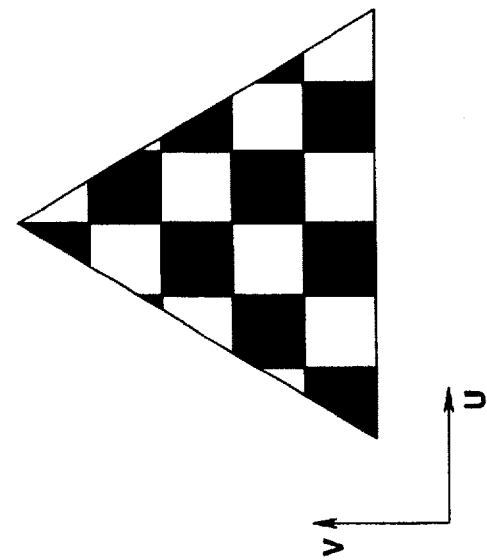
FIGS. 6(A) and 6(B) illustrate the screen coordinate system and the texture coordinate system on completion of texture mapping.
Figure 6A:
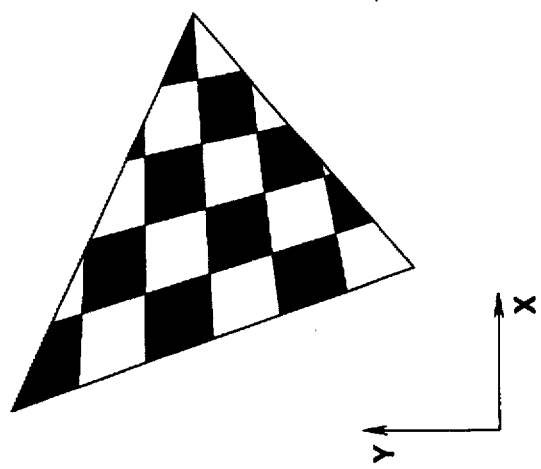
Figure 7:
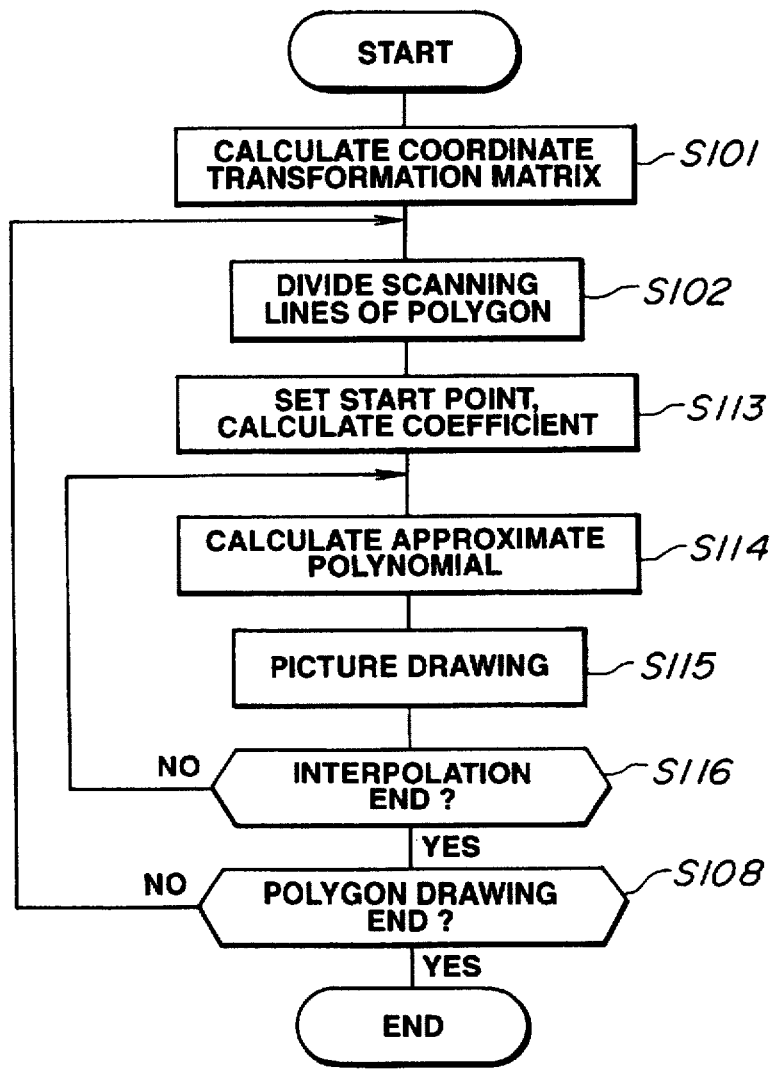
FIG. 7 is a flow chart for illustrating a conventional method of substituting the approximate polynomial

At the steps S3 to S9 of FIG. 9, the picture is coordinate-transformed from the start point to the end point on each scanning line or each arbitrary straight line pixel-by-pixel and pixel values of associated points on the texture coordinates are written for interpolation as shown in FIG. 5. The above operations are repeated at a step S9 for all scanning lines in the polygon.

The coordinate transformation equation at the time of the interpolation at the steps S3 to S8 is represented by a ratio of polynomials having components x, y of the screen coordinates, as pre-transformation coordinates, as variables, as shown by the equation 50. If the coordinate values of a k'th coordinate point on an arbitrary scanning line or a straight line in the polygon are represented as $(x_k, y_k)$, and the results of calculation of the polynomials of the denominator and the numerator of the coordinate values $(x_k, y_k)$ are represented as $N_k$, $D_k$, with the quotient obtained in integer division of the coordinate transformation equation and the remainder being $N_k/D_k$ and $R_k$, respectively, the following equation 51 holds:

$$N_k/D_k = Q_k \ldots R_k \quad (51)$$

If the coordinate values on the texture coordinate system associated with the k'th coordinate values $(x_k, y_k)$ on the screen coordinate system are represented as $(u_k, v_k)$, the above fractional equation is equivalent to an equation of finding components $u_k$, $v_k$ of the post-transformation coordinates by the equation 50. The coordinate components $u_k$, $v_k$, expressed by integers, represent the quotient $Q_k$.

If the fractional equation (51) is expressed by addition and multiplication, the following equation (1)

$$N_k = D_k \times Q_k + R_k \quad (1)$$

is obtained. If the coordinate values of the (k+1)th coordinate point, next to the above k'th coordinate point on the screen coordinates, are expressed as $(x_{k+1}, Y_{k+1})$, the results of calculations of the polynomials of the numerator and the denominator for the coordinate values of the (k+1)th coordinate point next to the k'th coordinate point are expressed by $N_{k+1}$, $D_{k+1}$, and the quotient and the remainder on integer division of the coordinate transformation equation $N_{k+1}/D_{k+1}$ are $Q_{k+1}$, $R_{k+1}$, respectively, so the following equation (2)

$$N_{k+1} = D_{k+1} \times Q_{k+1} + R_{k+1} \quad (2)$$

holds. A dividend difference $\Delta N$ and a divisor difference $\Delta D$ are given as $$\Delta N = N_{k+1} - N_k \quad (52)$$

$$\Delta D = D_{k+1} - D_k \quad (53)$$

respectively.

Rewriting the equation (1) using the difference of the dividend $\Delta N$ and the difference of the divisor $\Delta D$ gives the following equation (3), that is $$N_{k+1} = D_{k+1} \times Q_k + R_k + \Delta N - \Delta D \times Q_k \quad (3)$$

With the present embodiment, a component $Q_{k+1}$ of the next posttransformation coordinate following a known coordinate component $Q_k$ of the post-transformation coordinate point is found in lieu of calculating $N_{k+1}/D_{k+1}$ by taking advantage of the fact that the following equations (4) and (5)

$$Q_{k+1} = Q_k + (R_k + \Delta N - \Delta D \times Q_k)/D_{k+1} \quad (4)$$

$$R_{k+1} = (R_k + \Delta N - \Delta D \times Q_k) \bmod D_{k+1} \quad (5)$$

obtained on comparison of the equations (2) and (3) hold. In the equation (4), as will be explained later, the division is replaced by addition and multiplication for ease in calculation. The calculation accuracy or allowable error range $\Delta Q$ of the post-transformation coordinate is pre-set.

It is assumed that $D_k=7$, $Q_k=6$, $R_k=19$, $\Delta N=41$, $\Delta D=4$ and $\Delta Q=1$, and these values are used in the following computational example.

At an initial value computing step S3, the component $Q_k$ of the post-transformation coordinate, an error evaluation value $R_k$ as the above remainder, composite difference $C_k$ and the divisor $D_k$ at the start point are pre-calculated, from the pretransformation coordinate value 8 of FIG. 8, based upon the start point of the pre-transformation coordinate and the coordinate transformation coefficient transmitted to the initial value setting unit 6, and respectively stored in the post-transformation coordinate memory 4, error evaluation value memory 1, composite difference memory 2 and the divisor memory 3. The composite difference $C_k$ is $$C_k = Q_k \times \Delta D \quad (54)$$

On the other hand, the difference of the dividend $\Delta N$ and the difference of the divisor $\Delta D$, which are constants, are calculated by the equations (52), (53), and the allowable error range $\Delta Q$ of the post-transformation coordinate is also set. These values $C_k$, $\Delta N$, $\Delta D$ and $\Delta Q$ are respectively stored in the memories 20 to 23 in FIG. 1.

If the numerical values of the above example are applied to the above equation (54), $C_k=6\times 4=24$. On the other hand, 0 and $\Delta N$ are stored in the memory 20, while $\Delta D$ and 0 are stored in the memory 20. Besides, 0 and $\Delta D$ are stored in the memory 22 and $\Delta Q$ and 0 are stored in the memory 23.

At a step S4 of FIG. 9, it is judged by the error range detection unit 5 of FIG. 8 whether or not the error evaluation value $R_k$ from the error evaluation memory 1 is optimum. The resulting error detection output is routed to an updating unit 7 and an output control unit 10. The updating unit 7 causes processing to be branched in accordance with the result of error detection. An optimum range of the error evaluation value $R_k$ from the error evaluation value memory 1 is not less than 0 and less than $D_k$, that is $0 \leq R_k < D_k$. Should this condition be met, processing transfers to a step S6 and, should this condition be met, processing transfers to a step S5.

At the step S5, the value $Q_k$ of the post-transformation coordinate from the post-transformation coordinate value memory 4, the error evaluation value $R_k$ from the error evaluation value memory 1 and the composite difference $C_k$ from the composite difference value memory 2, shown in FIG. 8, are updated, herein corrected, by the updating unit 7. Processing then reverts to the step S4.

As for the updating or correction at the step S5, if $R_k<0$, $R_k$, $Q_k$ and $C_k$ are corrected according to the equations:

$$R_k \leftarrow R_k + |K_k| \quad (55)$$

$$Q_k \leftarrow Q_k + \Delta Q \quad (56)$$

$$C_k \leftarrow C_k + \Delta D \quad (57)$$

whereas, if $R_k \geq D_k$, $R_k$, $Q_k$ and $C_k$ are corrected according to the equations:

$$R_k \leftarrow R_k - |D_k| \qquad (58)$$

$$Q_k \leftarrow Q_k + \Delta Q \qquad (59)$$

$$C_k \leftarrow C_k + \Delta D \qquad (60)$$

If the above numerical values are taken as an example, since $R_k$ (=19)$\geq D_k$ (=7), correction is executed in accordance with the equations (58) to (60):

$$R_k = 19 - 7 = 12$$

$$Q_k = 6 + 1 = 7$$

$$C_k = 24 + 4 = 28$$

Since $R_k$ (=12)$\geq D_k$ (=7) as a result of the first correction, a second correction is executed:

$$R_k = 12 - 7 = 5$$

$$Q_k = 7 + 1 = 7$$

$$C_k = 28 + 4 = 32$$

Thus, after the second correction, the condition $0 \leq R_k$ (=5)$< D_k$ (=7) is met, so that the effective value of $Q_k$ (=8) is now found.

At the next step S6, the pixel value on the texture coordinate system, associated with the post-transformation value 9 taken out of the post-transformation coordinate value memory 4 and obtained via the output control unit 10, is written at a pixel in the polygon on the screen coordinates. In the above example of the numerical values, $Q_k=8$ becomes a component of the post-transformation coordinate, which is found for each of the components u and v of the texture coordinates so that the pixel values on the coordinates ($u_k$, $v_k$) are written on the pixels of the screen coordinates ($x_k$, $7_k$).

At the next step S7, it is judged whether or not interpolation (coordinate transformation) has been made up to an end point of the pre-transformation coordinate (the above-mentioned screen coordinate), that is, up to an end point of a scanning line within a polygon. If the result is NO, processing transfers to a step S8 and, if the result is YES, processing transfers to step S9.

At the step S8, the updating unit 7 of FIG. 8 updates the divisor value $D_k$ and the error evaluation value $R_k$. This corresponds to the equations (14) to (17):

$$D_{k+1} = D_k + \Delta D \qquad (14)$$

$$R_{k+1} = R_k + \Delta N - C_k \qquad (15)$$

$$Q_{k+1} = Q_k \qquad (16)$$

$$C_{k+1} C_k \qquad (17)$$

With the above example of the numerical values, $$D_{k+1} = 7 + 4 = 11$$

$$R_{k+1} = 5 + 41 - 32 = 14$$

$$Q_{k+1} = 8$$

$$C_{k+1} = 32$$

The above correction or updating at the step S5 and the updating at the step S8 are executed by the updating unit γ of FIG. 8. That is, an error detection result output of the error range detection unit 5 of FIG. 8 is supplied to respective control terminals of selective addition units 24 to 27 of the updating unit 7 for controlling the selective additive operations by these selective addition units 24 to 27. The selective addition nit 24 is fed with the error evaluation value $R_k$ from the error evaluation value memory 1, a dividend difference value ΔN from the memory 20 (0 and ΔN), the divisor value $D_k$ from the divisor value memory 22 and the composite difference $C_k$ from the composite difference value memory 2 (subtraction input—$C_k$). The selective addition unit 24 is responsive to the above error detection results to execute the arithmetic-logical operations according to the equations (15), (55) or (58). The selective addition unit 25 is fed with the composite difference value $C_k$ from the composite difference value memory 2 and the divisor difference value ΔD (ΔD and 0) from the memory 21 and is responsive to the result of error detection to execute the arithmetic-logical operations according to the equations (57) or (60). The selective addition unit 26 is fed with the divisor value $D_k$ from the divisor value memory 3 and the divisor difference value ΔD (0 and ΔD) from the memory 22 and is responsive to the result of error detection to execute the arithmetic-logical operations according to the equation (14). The selective addition unit 27 is fed with a component $Q_k$ of the post-transformation coordinate value from the post-transformation coordinate value memory 4 and the allowable error range of the post-transformation coordinate ΔQ (ΔQ and O) from the memory 23 and is responsive to the result of error detection to execute the arithmetic-logical operations according to the equations (56) or (60). The selective addition units 24 to 27 select and add memory outputs, where addition of 0 is equivalent to not executing the addition, that is to directly outputting the input. In lieu of such 0 addition, an output of the error range detection unit 5 may also be employed as an addition enabling signal. An output of the error range detection unit 5 indicating the result of error detection is also routed to a control terminal of the output control unit 10. The output control unit 10 outputs a component $Q_k$ of the post-transformation coordinate value from the post-transformation coordinate memory 4 as an ultimate post-transformation coordinate value 9 when the above condition $0 < R_k < D_k$ holds.

Directly after actual calculation of the coordinate transformation equation $N_k/D_k$ at the start point of the polygon on the scanning line at the initial value calculating step S3 to find the post-transformation coordinate component $Q_k$, if the condition for error evaluation is judged to be met at the error evaluation step S4, processing transfers to the step S6 in order to write the pixel value on the texture coordinate system corresponding to the post-transformation value $Q_k$ at the pixel position within the polygon. At the next step S7, it is judged whether or not coordinate transformation by interpolation has been made up to the end point of the polygon on the same scanning line. If the result of judgment is NO, that is if it is found that the above end point is not reached, processing transfers to the step S8 where the divisor value $D_k$ and the error evaluation value $R_k$ are respectively updated to the divisor value $D_{k+1}$ and the error evaluation value $R_{k+1}$ at the next (k+1)th coordinate point on the pre-transformation coordinate system (the screen coordinate system). Processing then transfers to the step S4.

Figure 10:
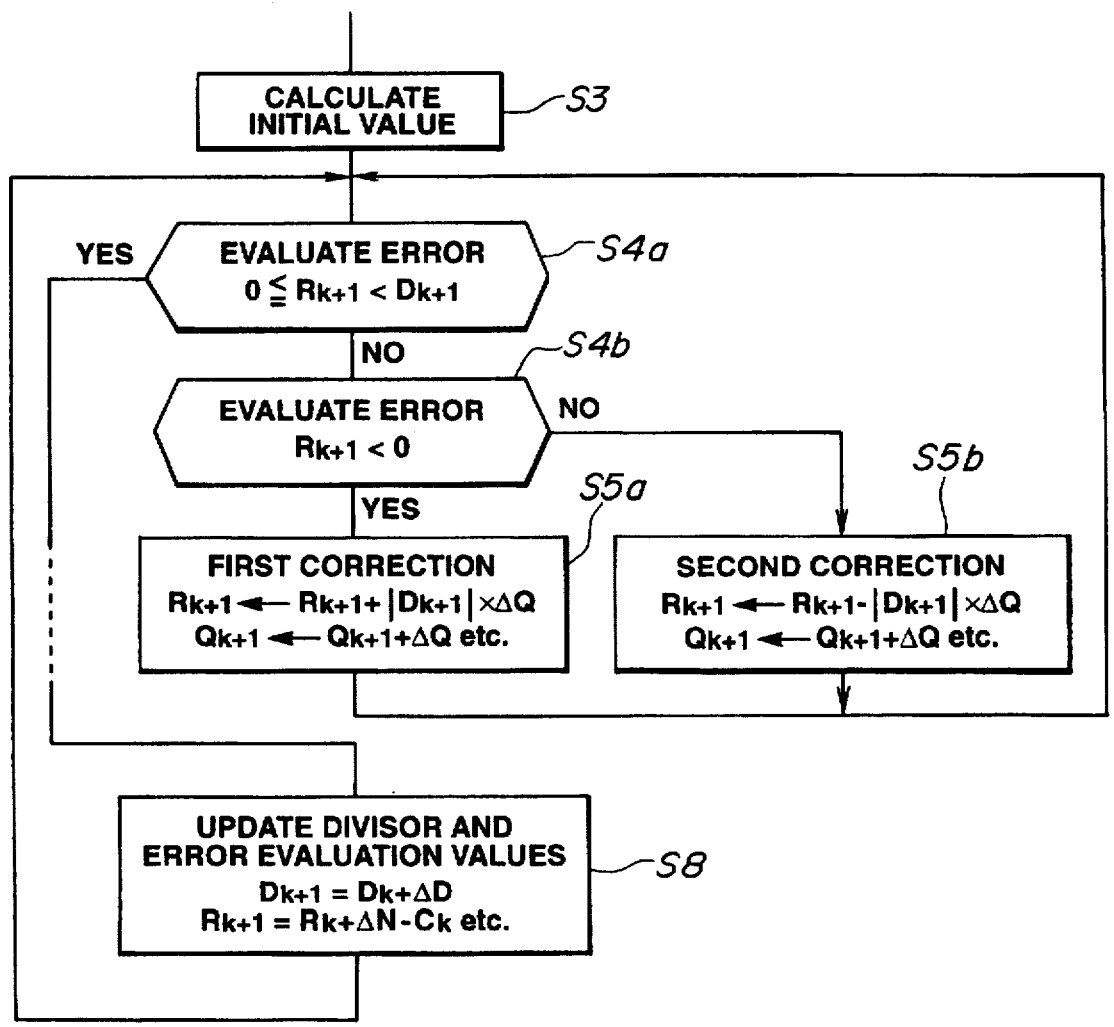
FIG. 10 is a flow chart for illustrating an example of essential portions of the operation of an embodiment of a coordinate transformation method according to the present invention.

Consequently, except the processing immediately following the calculation of the initial value, transfer to the error evaluation step S4 may be regarded to occur after the updating at the step S8. The equations (14) to (17) and (18)

to (23) represent the calculation equations at the steps S8 and S5, when it is assumed that the component of the post-transformation coordinate $Q_{k+1}$ is found by the equation (4) and (5) using the known component of the post-transformation coordinate $Q_k$. FIG. 10 shows the flow chart of the essential portions of the interpolation operations, formulated under the above assumptions.

In FIG. 10, it is presupposed that the component $Q_k$ of the post-transformation coordinate corresponding to the k'th coordinate point of the pre-transformation coordinate system (the above-mentioned screen coordinate system) has already been found by the initial value calculation or the above-mentioned interpolation operations. Under these presuppositions, calculations for the equations (14) to (17) are executed at the step S8, using this known value of $Q_k$, in order to find or update the divisor value $D_{k+1}$, error evaluation value $R_{k+1}$, post-transformation coordinate value $Q_{k+1}$ and the composite difference value $C_{k+1}$.

The error evaluation corresponding to the step S4 of FIG. 9 is then performed on the error evaluation value $R_{k+1}$. In the present example of FIG. 10, it is judged at the step 4a whether or not the condition of the error evaluation value $R_{k+1}$ being not less than zero and being less than the value of $D_{k+1}$ is met ($0<R_{k+1}<D_{k+1}$). If the result of judgment at the step 4a is YES, processing transfers to a step S8, via step S6, unless interpolation comes to a close. If the result of step 4a is NO, it is judged at a step 4b whether $R_{k+1}<0$ (YES) or $D_{k+1} \leq R_{k+1}$ (NO). If the result is YES, processing transfers to a first correction step of the step 5a and, if the result is NO, processing transfers to the second correction step of the step 5b.

During the first correction step of the step 5a, correction is performed by calculating the equations (18) to (20), that is $$R_{k+1} \leftarrow R_{k+1} + |D_{k+1}| \times \Delta Q \tag{18}$$

$$Q_{k+1} \leftarrow Q_{k+1} + \Delta Q \tag{19}$$

$$C_{k+1} \leftarrow C_k + \Delta D \times \Delta Q \tag{20}$$

where $\leftarrow$ indicates substitution. During the second correction step of the step 5b, correction is performed by calculating the equations (21) to (23), that is $$R_{k+1} \leftarrow R_{k+1} + |D_{k+1}| \times \Delta Q \tag{21}$$

$$Q_{k+1} \leftarrow Q_{k+1} + \Delta Q \tag{22}$$

$$C_{k+1} \leftarrow C_k + \Delta D \times \Delta Q \tag{23}$$

Figures 3A, 3B:
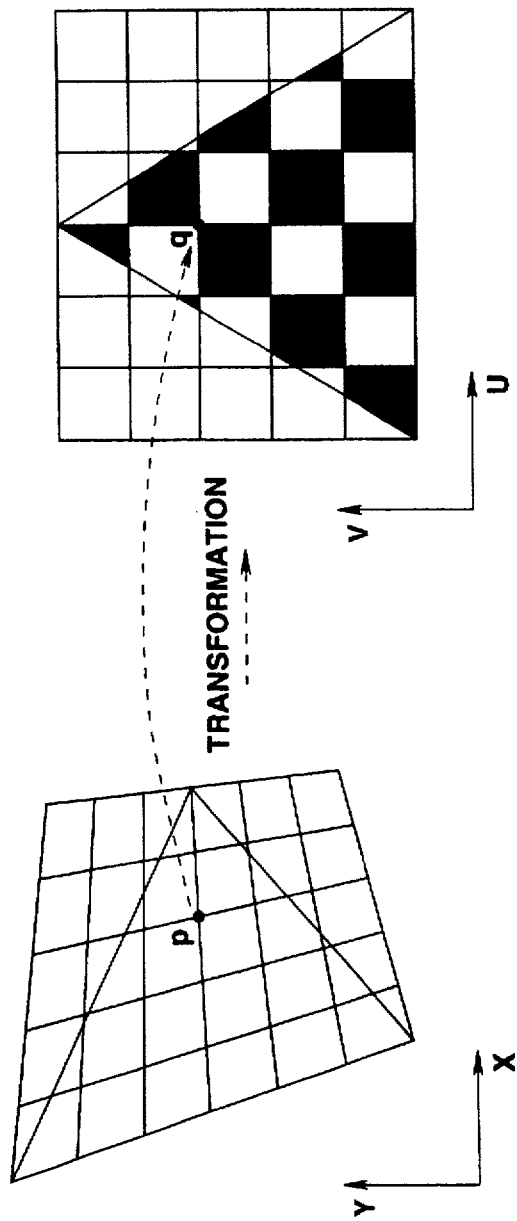
FIGS. 3(A) and (B) illustrate coordinate transformation with the relation of correspondence between the screen coordinate system and the texture coordinate system.
Figure 4:
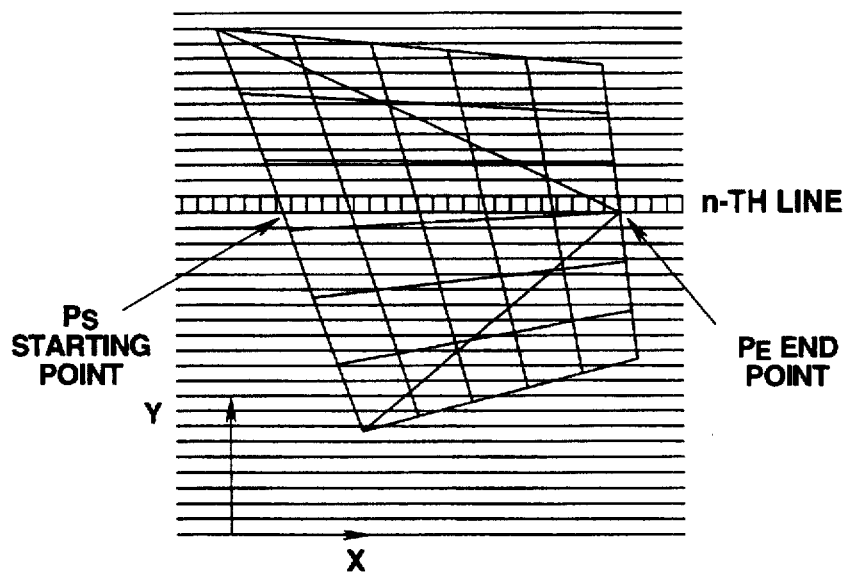
FIG. 4 illustrates a start point and end point on an n'th scanning line on dividing a polygon on a screen coordinate system into plural scanning lines.

After the first and second correction operations at the steps 5a and 5b, processing again transfers to the error evaluation step (step S4a in FIG. 3) and the first and second correction operations are repeated until the condition ($0 \leq R_{k+1} < D_{k+1}$) is met.

By employing the above-described apparatus and method, correct results of calculations according to the calculation equation including the division may be obtained, while coordinate transformation can be realized by only addition and subtraction without employing division.

The operation of coordinate transformation (interpolation) may also be executed without employing the composite difference value $C_k$, in which case the calculations according to the equations (6) to (8), equations (9) and (10) and the equations (11) and (12) are carried out during the updating process, first correction process and during the second correction process, respectively.

The memory 20 of FIG. 8 may be eliminated by having the dividend difference value $\Delta N$ included in, that is added to the composite difference value $C_k$. Since this is equivalent to employing $C_k - \Delta N$ in lieu of $C_k$, it suffices to find the composite difference value $C_k$ during calculation of the initial value from the equation (24):

$$C_k = \Delta D \times Q_k - \Delta N \tag{24}$$

On the other hand, the error evaluation value $R_k$ may be updated using the above equation (26):

$$R_{k+1} = R_k - C_k \tag{26}$$

For updating at the step S8, first correction at the step S5a and for second correction at the step S5b, it suffices to carry out the calculations of the equations (25) to (28), equations (29) to (31) and the equations (32) to (34), respectively. The equations (25), (27) and (28) used for the updating are equivalent to the equations (14), (16) and (17), respectively.

Since $\Delta N$ is absorbed in such case in the composite difference value $C_k$, the memory 20 for storing $\Delta N$ in FIG. 1 may be dispensed with.

As still another example, it is also possible to calculate the composite difference value $C_k$ using the above equation 35 similar to the equation 24, and to use the divisor value $D_k$ and the divisor difference value $\Delta D$ previously multiplied by $\Delta Q$ by calculating the equations 36 and 37:

$$D_k \leftarrow D_k \times \Delta Q \tag{36}$$

$$\Delta D \leftarrow \Delta D \times \Delta Q \tag{37}$$

for simplifying the calculation during the correction.

That is, during the first correction process, the equations (42) to (44):

$$R_{k+1} R_{k+1} + |D_{k+1}| \tag{42}$$

$$Q_{k+1} \leftarrow Q_{k+1} + \Delta Q \tag{43}$$

$$C_{k+1} \leftarrow C_k + \Delta D \tag{44}$$

are calculated, whereas, during the second process, the above equations (45) to (47):

$$R_{k+1} \leftarrow R_{k+1} |D_{k+1}| \tag{45}$$

$$Q_{k+1} \leftarrow Q_{k+1} + \Delta Q \tag{46}$$

$$C_{k+1} C_k + \Delta D \tag{47}$$

are calculated. In these, the equations (43) and (46) are identical with the equations (19) and (22), respectively. For the above updating process, calculations may be performed using the equations (38) to (41) which are identical with the equations (25) to (28), respectively.

The present invention is not limited to the above-described embodiments. For example, instead of dividing a polygon on a screen coordinate system by plural scanning lines parallel to the X-axis (horizontal axis), and coordinate-transforming the pixels within the polygon along these scanning lines by way of interpolation, the polygon may also be divided by plural straight lines parallel to the Y-axis (vertical axis) or by plural parallel straight lines having a pre-set gradient. The pixels to be processed next to the finding of the results of coordinate transformation of a given pixel may be those spaced apart at a pre-set interval instead of being mutually neighboring pixels.

What is claimed is:

1. A texture mapping coordinate transformation apparatus for producing post-transformation coordinates by a ratio of plural polynomials having pre-transformation coordinates as variables in order to map a texture picture on a polygon defined by perspective coordinates on a display screen to thereby generate an output display picture on the display screen, comprising:
    post-transformation coordinate storage means for storing the post-transformation coordinates,
    error evaluation value storage means for storing error evaluation values of said post-transformation coordinates,
    error judgment means for judging that the error evaluation value is within a tolerable range,
    initial value setting means for setting respective initial values of the post-transformation coordinate storage means and said error evaluation value storage means based upon said pretransformation coordinates, and
    updating means for updating the contents of the post-transformation coordinate storage means and the error evaluation value storage means responsive to an output of said error judgment means, and
    means for sequentially finding said post-transformation coordinates from said pre-transformation coordinates.

2. The coordinate transformation apparatus as claimed in claim 1 wherein said updating means comprises selective arithmetic-logical units for selecting plural inputs and executing arithmetic-logical operations thereon, and
    wherein said post-transformation coordinate storage means and said error evaluation value storage means are updated in parallel for expediting the operation.

3. A coordinate transformation method using a programmed computer for mapping a polygon defined by pre-transformation coordinates on a two-dimensional screen onto a texture picture by producing post-transformation coordinates by a ratio of plural polynomials having the pre-transformation coordinates as variables, comprising the step of:
    repeatedly and sequentially finding a component $Q_{k+1}$ of the post-transformation coordinate next to a known coordinate component $Q_k$ of the post-transformation coordinate point by calculating the equations:

$$Q_{k+1} = Q_k + (R_k + \Delta N - \Delta D \times Q_k)/D_{k+1} \quad (4)$$

$$R_{k+1} = (R_k + \Delta N - \Delta D \times Q_k) \bmod D_{k+1} \quad (5)$$

wherein $N_k$ and $D_k$ are polynomials which are the functions of coordinate components of an arbitrary k'th coordinate point before transformation, $\Delta N$ is a dividend difference $N_{k+1} - N_k$, $\Delta D$ is a divisor difference $D_{k+1} - D_k$, and $R_k$ is the remainder of $N_k/D_k$, with the component $Q_{k+1}$ being calculated with the division in the equation (4) being replaced by a value substitution obtained by using addition and subtraction.

4. The coordinate transformation method as claimed in claim 3 wherein the component $Q_{k+1}$ of the post-transformation coordinate is found from the equations (4) and (5) using a known component of the post-transformation coordinate $Q_k$, comprising:
    a first calculating step of setting a constant $\Delta Q$, an allowable calculation error range of the post-transformation coordinate, and finding the dividend difference value $\Delta N$ and the divisor difference value $\Delta D$ by calculations,
    a second calculating step of finding $D_{k+1}$, $R_{k+1}$, $Q_{k+1}$ by calculating equations $$D_{k+1} = D_k + \Delta D \quad (6)$$

$$R_{k+1} = R_k + \Delta N - \Delta D \times Q_k \quad (7)$$

$$Q_{k+1} = Q_k \quad (8)$$

a first correction step of executing correction by $$R_{k+1} \leftarrow R_{k+1} + |D_{k+1}| \times \Delta Q \quad (9)$$

$$Q_{k+1} \leftarrow R_{k+1} + \Delta Q \quad (10)$$

where $\leftarrow$ denotes substitution, if the condition of the found value of $R_{k+1}$ being smaller than 0 ($R_{k+1} < 0$) is met,
    a second correction step of executing correction by $$R_{k+1} \leftarrow R_{k+1} - |D_{k+1}| \times \Delta Q \quad (11)$$

$$Q_{k+1} \leftarrow Q_{k+1} + \Delta Q \quad (12)$$

if the condition of the found value of $R_{k+1}$ being not less than the value of $D_{k+1}$ ($D_{k+1} \leq R_{k+1}$) is met,
    an error evaluating step of judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

5. The coordinate transformation method as claimed in claim 4 wherein, after executing the first calcultig step once, the second calculating step, the first or second correction step and the error evaluation step are repeated for executing coordinate transformation for a series of coordinates.

6. The coordinate transformation method as claimed in claim 4 wherein the constant $\Delta Q$, an allowable calculation error range for the post-transformation coordinate, is set to 1.

7. The coordinate transformation method as claimed in claim 3 wherein the component $Q_{k+1}$ of the post-transformation coordinate is found from the equations (4) and (5) using a known component of the post-transformation coordinate $Q_k$, comprising
    first calculating step of setting a constant $\Delta Q$, an allowable calculation error range of the post-transformation coordinate, and finding the dividend difference value $\Delta N$ and the divisor difference value $\Delta D$ by calculations, and finding a composite difference value $C_k$ by $$C_k = \Delta D \times Q_k \quad (13)$$

a second calculating step of finding $D_{k+1}$, $R_{k+1}$, $Q_{k+1}$ and $C_{k+1}$ by $$D_{k+1} = D_k + \Delta D \quad (14)$$

$$R_{k+1} = R_k + \Delta N - C_k \quad (15)$$

$$Q_{k+1} \; Q_k \quad (16)$$

$$C_{k+1} = C_k \quad (17)$$

a first correcting step of executing the correction by $$R_{k+1} \leftarrow R_{k+1} + |D_{k+1}| \times \Delta Q \quad (18)$$

$$Q_{k+1} \leftarrow Q_{k+1} + \Delta Q \tag{19}$$

$$C_{k+1} \leftarrow C_k + \Delta D \times \Delta Q \tag{20}$$

where ← denotes substitution, if the condition of the found value of $R_{k+1}$ being smaller than 0 is met ($R_{k+1}<0$), a second correcting step of executing the correction by $$R_{k+1} \leftarrow R_{k+1} + |D_{k+1}| \times \Delta Q \tag{21}$$

$$Q_{k+1} \leftarrow Q_{k+1} + \Delta Q \tag{22}$$

$$C_{k+1} \leftarrow C_k + \Delta D \times \Delta Q \tag{23}$$

if the condition of the found value of $R_{k+1}$ being not less than the above value of $D_{k+1}$ is met ($D_{k+1} \leq R_{k+1}$) and an error evaluating step of judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

8. The coordinate transformation method as claimed in claim 3 wherein the component of $Q_{k+1}$ the post-transformation coordinate is found from the equations (4) and (5) using a known component of the post-transformation coordinate $Q_k$, comprising:

a first calculating step of setting a constant $\Delta Q$, an allowable calculation error range of the post-transformation coordinate, and finding the dividend difference value $\Delta N$ and the divisor difference value $\Delta D$ by calculations, and finding a composite difference value $C_k$ by $$C_k = \Delta D \times Q_k - \Delta N \tag{24}$$

a second calculating step of finding $D_{k+1}$, $R_{k+1}$, $Q_{k+1}$ and $C_{k+1}$ by $$D_{k+1} = D_k + \Delta D \tag{25}$$

$$R_{k+1} = R_k - C_k \tag{26}$$

$$Q_{k+1} = Q_k \tag{27}$$

$$C_{k+1} = C_k \tag{28}$$

a first correcting step of executing the correction by $$R_{k+1} \leftarrow R_{k+1} + |D_{k+1}| \times \Delta Q \tag{29}$$

$$Q_{k+1} \leftarrow Q_{k+1} + \Delta Q \tag{30}$$

$$C_{k+1} \leftarrow C_k + \Delta D \times \Delta Q \tag{31}$$

where ← denotes substitution, if the condition of the found value of $R_{k+1}$, being smaller than 0 is met ($R_{k+1}<0$), a second correcting step of executing the correction by $$R_{k+1} \leftarrow R_{k+1} - |D_{k+1}| \times \Delta Q \tag{32}$$

$$Q_{k+1} \leftarrow Q_{k+1} + \Delta Q \tag{33}$$

$$C_{k+1} \leftarrow C_k + \Delta D \times \Delta Q \tag{34}$$

if the condition of the found value of $R_{k+1}$ being not less than the above value of $D_{k+1}$ is met ($D_{k+1} \leq R_{k+1}$), and an error evaluating step of judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value Of $Q_{k+1}$ when the above condition is met being the ultimate result of coordinate transformation.

9. The coordinate transformation method as claimed in claim 3 wherein the component $Q_{k+1}$ of the post-transformation coordinate is found from the equations (4) and (5) using a known component of the post-transformation coordinate $Q_k$, comprising a first calculating step of setting a constant $\Delta Q$, an allowable calculation error range of the post-transformation coordinate, and finding the dividend difference value $\Delta N$ and the divisor difference value $\Delta D$ by calculations, and finding a composite difference value $C_k$, a divisor value $D_k$ and a divisor difference value $\Delta D$ by $$C_k = \Delta D \times Q_k - \Delta N \tag{35}$$

$$D_k \leftarrow D_k X \Delta Q \tag{36}$$

$$\Delta D \leftarrow \Delta D \times \Delta Q \tag{37}$$

where denotes ← substitution, a second calculating step of finding $D_{k+1}$, $R_{k+1}$, $Q_{k+1}$ and $C_{k+1}$ by $$D_{k+1} = D_k + \Delta D \tag{38}$$

$$R_{k+1} = R_k - C_k \tag{39}$$

$$Q_{k+1} = Q_k \tag{40}$$

$$C_{k+1} = C_k \tag{41}$$

a first correcting step of executing the correction by $$R_{k+1} \leftarrow R_{k+1} + |D_{k+1}| \tag{42}$$

$$Q_{k+1} \leftarrow Q_{k+1} + \Delta Q \tag{43}$$

$$C_{k+1} \leftarrow C_k + \Delta D \tag{44}$$

if the condition of the found value of $R_{k+1}$ is not larger than 0 is met ($R_{k+1}<0$) is met, a second correcting step of executing the correction by $$R_{k+1} \leftarrow R_{k+1} - |D_{k+1}| \tag{45}$$

$$Q_{k+1} \leftarrow Q_{k+1} + \Delta Q \tag{46}$$

$$C_{k+1} \leftarrow C_k + \Delta D \tag{47}$$

if the condition of the found value of $R_{k+1}$ being not less than the above value of $D_{k+1}$ is met ($D_{k+1} \leq R_{k+1}$) and an error evaluating step of judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

10. A texture mapping coordinate transformation apparatus for producing post-transformation coordinates by a ratio of plural polynomials having pre-transformation coordinates as variables in order to map a texture picture on a polygon defined by perspective coordinates on a display screen to thereby generate an output display picture on the display screen, comprising:

post-transformation coordinate storage means for storing the post-transformation coordinate component $Q_k$, wherein $Q_k = (N_k/D_k) - R_k$, $N_k$ and $D_k$ are polynomials which are the functions of coordinate components of an arbitrary k'th coordinate point before transformation, and $R_k$ is the remainder of the integer division of $N_k/D_k$ and is also an error evaluation value of the post-transformation coordinates, error evaluation value storage means for storing the error evaluation values $R_k$ of the post-transformation coordinates, error judgment means for judging that the error evaluation value $R_k$ is within a tolerable range of $0 \leq R_k < D_k$, initial value setting means for setting respective initial values $Q_k$, $R_k$ of the post-transformation coordinate storage means and the error evaluation value storage means based upon the pre-transformation coordinates, updating means for updating the contents of the post-transformation coordinate storage means and the error evaluation value storage means responsive to an output of the error judgment means, and means for sequentially finding the post-transformation coordinates from the pre-transformation coordinates by repeatedly and sequentially finding a component $Q_{k+1}$ of the post-transformation coordinate next to a known coordinate component $Q_k$ of the post-transformation coordinate point by calculating the equations:

$$Q_{k+1} = Q_k + (R_k + \Delta N - \Delta D \times Q_k)/D_{k+1} \quad (4)$$

$$R_{k+1} = (R_k + \Delta N - \Delta D \times Q_k) \bmod D_{k+1} \quad (5)$$

wherein $\Delta N$ is a dividend difference $N_{k+1} - N_k$, and $\Delta D$ is a divisor difference $D_{k+1} - D_k$, with the component $Q_{k+1}$ being calculated in equation (4) by substituting division and subtraction operations for the step of division by employing substitute known values.

11. The texture mapping coordinate transformation apparatus as claimed in claim 10 wherein the component $Q_{k+1}$ of the post-transformation coordinate is found from the equations (4) and (5) using a known component of the post-transformation coordinate $Q_k$, by:

first means for setting a constant $\Delta Q$, an allowable calculation error range of the post-transformation coordinate, and finding the dividend difference value $\Delta D$ and the divisor difference value $\Delta D$ by calculations, a second means for finding $D_{k+1}$, $R_{k+1}$, $Q_{k+1}$ by calculating equations $$D_{k+1} = D_k + \Delta D \quad (6)$$

$$R_{k+1} = R_k + \Delta N - \Delta D \times Q_k \quad (7)$$

$$Q_{k+1} = Q_k \quad (8)$$

a first correction means for executing correction by setting $$R_{k+1} \leftarrow R_{k+1} + |D_{k+1}| \times \Delta Q \quad (9)$$

$$Q_{k+1} \leftarrow R_{k+1} + \Delta Q \quad (10)$$

where $\leftarrow$ denotes substitution, if the condition of the found value of $R_{k+1}$ being smaller than 0 ($R_{k+1} < 0$) is met, a second correction means for executing correction by setting $$R_{k+1} \leftarrow R_{k+1} - |D_{k+1}| \times \Delta Q \quad (11)$$

$$q_{k+1} \leftarrow Q_{k+1} + \Delta Q \quad (12)$$

if the condition of the found value of $R_{k+1}$ being not less than the above value of $D_{k+1}$ is met, i.e. ($D_{k+1} \leq R_{k+1}$), an error evaluating means for judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

12. The texture mapping coordinate transformation apparatus as claimed in claim 11, wherein, after executing the first calculating step once, the second calculating step, the first or second correction step and the error evaluatoin step are repeated for executing coordinate transformation for a series of coordinates.

13. The texture mapping coordinate transformation apparatus as claimed in claim 11, wherein the constant $\Delta Q$, an allowable calculation error range of the post-transformation coordinates, is set to 1.

14. The texture mapping coordinate transformation apparatus as claimed in claim 10 wherein the component $Q_{k+1}$ of the post-transformation coordinate is found from the equations (4) and (5) using a known component of the post-transformation coordinate $Q_k$, by:

a first calculating means for setting a constant $\Delta Q$, an allowable calculation error range of the post-transformation coordinate, and finding the dividend difference value $\Delta N$ and the divisor difference value $\Delta D$ by calculations, and finding a composite difference value $C_k$ by setting $$C_k = \Delta D \times Q_k \quad (13)$$

a second calculating means for finding $D_{k+1}$, $R_{k+1}$, $Q_{k+1}$ and $C_{k+1}$ by setting $$D_{k+1} = D_k + \Delta D \quad (14)$$

$$R_{k+1} = R_k + \Delta N - C_k \quad (15)$$

$$Q_{k+1} = Q_k \quad (16)$$

$$C_{k+1} = C_k \quad (17)$$

a first correcting means for executing the correction by setting $$R_{k+1} \leftarrow R_{k+1} + |D_{k+1}| \times \Delta Q + \text{tm} \quad (18)$$

$$Q_{k+1} \leftarrow Q_{k+1} + \Delta Q \quad (19)$$

$$C_{k+1} \leftarrow C_k + \Delta D \times \Delta Q \quad (20)$$

where $\leftarrow$ denotes substitution, if the condition of the found value of $R_k +$, being smaller than 0 is met ($R_{k+1} < 0$), a second correcting means for executing the correction by setting $$R_{k+1} \leftarrow R_{k+1} + |D_{k+1}| \times \Delta Q \quad (21)$$

$$Q_{k+1} \leftarrow Q_{k+1} + \Delta Q \tag{22}$$

$$C_{k+1} \leftarrow C_k + \Delta D \times \Delta Q \tag{23}$$

if the condition of the found value of $R_{k+1}$ being not less than the above value of $D_{k+1}$ is met ($D_{k+1} \leq R_{k+1}$) and an error evaluating means for judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

15. The texture mapping coordinate transformation apparatus as claimed in claim 10 wherein the component of $Q_{k+1}$ the post-transformation coordinate is found from the equations (4) and (5) using a known component of the post-transformation coordinate $Q_k$, by:

a first calculating means for setting a constant $\Delta Q$, an allowable calculation error range of the post-transformation coordinate, and finding the dividend difference value $\Delta N$ and the divisor difference value $\Delta D$ by calculations, and finding a composite difference value $C_k$ by setting $$C_k = \Delta D \times Q_k - \Delta N \tag{24}$$

a second calculating means for finding $D_{k+1}$, $R_{k+1}$, $Q_{k+1}$ and $C_{k+1}$ by setting $$D_{k+1} = D_k + \Delta D \tag{25}$$

$$R_{k+1} = R_k - C_k \tag{26}$$

$$Q_{k+1} = Q_k \tag{27}$$

$$C_{k+1}\ C_k \tag{28}$$

a first correcting means for executing the correction by setting $$R_{k+1} \leftarrow R_{k+1} + |D_{k+1}| \times \Delta Q \tag{29}$$

$$Q_{k+1} \leftarrow Q_{k+1} + \Delta Q \tag{30}$$

$$C_{k+1} \leftarrow C_k + \Delta D \times \Delta Q \tag{31}$$

where $\leftarrow$ denotes substitution, if the condition of the found value of $R_{k+1}$ being smaller than 0 is met ($R_{k+1} < 0$), a second correcting means for executing the correction by setting $$R_{k+1} \leftarrow R_{k+1} - |D_{k+1}| \times \Delta Q \tag{32}$$

$$Q_{k+1} \leftarrow Q_{k+1} + \Delta Q \tag{33}$$

$$C_{k+1} \leftarrow C_k + \Delta D \times \Delta Q \tag{34}$$

if the condition of the found value of $R_{k+1}$ being not less than the above value of $D_{k+1}$ is met ($D_{k+1} \leq R_{k+1}$), and an error evaluating means for judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

16. The texture mapping coordinate transformation apparatus as claimed in claim 10 wherein the component $Q_{k+1}$ of the post-transformation coordinate is found from the equations (4) and (5) using a known component of the post-transformation coordinate $Q_k$, by:

a first calculating means for setting a constant $\Delta Q$, an allowable calculation error range of the post-transformation coordinate, and finding the dividend difference value $\Delta N$ and the divisor difference value $\Delta D$ by calculations, and finding a composite difference value $C_k$, a divisor value $D_k$ and a divisor difference value $\Delta D$ by setting $$C_k = \Delta D \times Q_k - \Delta N \tag{35}$$

$$D_k \leftarrow D_k \times \Delta Q \tag{36}$$

$$\Delta D \leftarrow \Delta D \times \Delta Q \tag{37}$$

where $\leftarrow$ denotes substitution, a second calculating means for finding $D_{k+1}$, $R_{k+1}$, $Q_{k+1}$ and $C_{k+1}$ by setting $$D_{k+1} = D_k + \Delta D \tag{38}$$

$$R_{k+1} = R_k - C_k \tag{39}$$

$$Q_{k+1} = Q_k \tag{40}$$

$$C_{k+1} = C_k \tag{41}$$

a first correcting means for executing the correction by setting $$R_{k+1} \leftarrow R_{k+1} + |D_{k+1}| \tag{42}$$

$$Q_{k+1} \leftarrow Q_{k+1} + \Delta Q \tag{43}$$

$$C_{k+1} \leftarrow C_k + \Delta D \tag{44}$$

if the condition of the found value of $R_{k+1}$ is not larger than 0 is met ($R_{k+1} < 0$) is met, a second correcting means for executing the correction by setting $$R_{k+1} \leftarrow R_{k+1} - |D_{k+1}| \tag{45}$$

$$Q_{k+1} \leftarrow Q_{k+1} + \Delta Q \tag{46}$$

$$C_{k+1} \leftarrow C_k + \Delta D \tag{47}$$

if the condition of the found value of $R_{k+1}$ being not less than the above value of $D_{k+1}$ is met ($D_{k+1} \leq R_{k+1}$), and an error evaluating means for judging whether or not the condition of the found value of $R_{k+1}$ being not less than 0 and less than the value of $D_{k+1}$ is met ($0 \leq R_{k+1} < D_{k+1}$) and repeating the first or second correction step if such condition is not met, with the value of $Q_{k+1}$ when the above condition is met being the ultimate result of coordinate transformation.

* * * * *

UNITED STATES PATENT AND TRADEMARK OFFICE
CERTIFICATE OF CORRECTION

PATENT NO.: 5,748,869
DATED: May 5, 1998
INVENTOR(S): HIROYUKI SHIOYA

It is certified that errors appear in the above-identified patent and that said Letters Patent is hereby corrected as shown below:

In Col. 16, line 35 (line 6 of Claim 7), before "first" insert "a"

In Col. 16, line 45 (line 16 of Claim 7), before "Qk" insert " = "

In Col. 18, line 37 (line 30 of Claim 9), replace " † " with " | "

In Col. 20, line 46 (line 21 of Claim 14), delete " +tm" and move "(18)" to the right margin In Col. 20, line 50 (line 25 of Claim 14), replace "$R_k+,$" with --$R_{k+1}$--

Signed and Sealed this

Twenty-ninth Day of September, 1998

Attest:

BRUCE LEHMAN

Attesting Officer     Commissioner of Patents and Trademarks